(12) United States Patent
Lei et al.

(10) Patent No.: US 11,093,348 B2
(45) Date of Patent: Aug. 17, 2021

(54) METHOD, DEVICE AND COMPUTER PROGRAM PRODUCT FOR RECOVERING METADATA

(71) Applicant: EMC IP Holding Company LLC, Hopkinton, MA (US)

(72) Inventors: Lu Lei, Shanghai (CN); Xiao Chen, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 147 days.

(21) Appl. No.: 16/439,597

(22) Filed: Jun. 12, 2019

(65) Prior Publication Data
US 2020/0142784 A1 May 7, 2020

(30) Foreign Application Priority Data
Nov. 2, 2018 (CN) .......................... 201811299996.5

(51) Int. Cl.
*G06F 11/00* (2006.01)
*G06F 11/14* (2006.01)
*G06F 16/22* (2019.01)

(52) U.S. Cl.
CPC ...... *G06F 11/1469* (2013.01); *G06F 11/1451* (2013.01); *G06F 16/2246* (2019.01); *G06F 2201/82* (2013.01)

(58) Field of Classification Search
CPC .......................... G06F 11/1402; G06F 11/1469
USPC ...................................................... 714/1–57
See application file for complete search history.

(56) References Cited

U.S. PATENT DOCUMENTS

| 8,898,409 B1* | 11/2014 | Natanzon | G06F 12/16 711/162 |
| 2012/0284572 A1* | 11/2012 | Shirakawa | G06F 16/2246 714/54 |
| 2012/0297247 A1* | 11/2012 | Aronovich | G06F 12/0828 714/15 |
| 2014/0032965 A1* | 1/2014 | Tsukamoto | G06F 11/0778 714/30 |
| 2016/0004616 A1* | 1/2016 | Narita | G06F 3/065 714/6.3 |
| 2016/0019131 A1* | 1/2016 | Biberdorf | G06F 11/0709 714/45 |
| 2019/0243732 A1* | 8/2019 | Tati | G06F 11/1471 |

\* cited by examiner

*Primary Examiner* — Sarai E Butler
(74) *Attorney, Agent, or Firm* — Amin, Turocy & Watson, LLP

(57) ABSTRACT

Embodiments of the present disclosure relate to a method, device and computer program product for recovering metadata. The method comprises detecting whether first metadata corresponding to a first journal at a first device is corrupted, and obtaining second metadata corresponding to a second journal from a second device in the case that the first metadata is corrupted, wherein the second device is remote from the first device. The method further includes recovering the first metadata based on the second metadata, the first journal and the second journal. Embodiments of the present disclosure utilize remote backup metadata for recovery in the case that local metadata (which for example includes index information) is corrupted without reserving metadata snapshot locally, thereby saving the storage space.

20 Claims, 4 Drawing Sheets

US 11,093,348 B2

METHOD, DEVICE AND COMPUTER PROGRAM PRODUCT FOR RECOVERING METADATA

RELATED APPLICATION

The present application claims the benefit of priority to Chinese Patent Application No. 201811299996.5, filed on Nov. 2, 2018, which application is hereby incorporated into the present application by reference herein in its entirety.

FIELD

Embodiments of the present disclosure generally relate to the field of storage, and more specifically, to a method, device and computer program product for recovering metadata.

BACKGROUND

Metadata is a type of data that is used for describing data, and it may be used to describe information of data attributes for supporting various functions such as indicating storage locations, historical data, resource search, file records and the like. Journals are used to store information of events occurring in a system and records of operation executed for various objects. Whenever an object update operation (for example, creating, rewriting, updating, deleting and the like) happens, the storage system first stores the journals in physical bocks persistently and then places the journals into metadata cache of the memory. As long as the journals are stored persistently, the storage system will regard these transactions committed.

If a memory cache is full or a period of time elapses, the storage system loads the latest metadata which are dumped to physical blocks last round, merges the metadata last round with journals stored in the memory cache, and then dumps the updated metadata to the physical blocks. Since the journals are stored persistently, no transaction would be lost. Therefore, the storage system can obtain the latest metadata by loading the latest dumped metadata as well as replaying journals.

SUMMARY

Embodiments of the present disclosure provide a method, device and computer program product for recovering metadata.

In a first aspect of the present disclosure, there is provided a method for recovering metadata. The method comprises detecting whether first metadata corresponding to a first journal at a first device is corrupted, and in response to detecting that the first metadata is corrupted, obtaining, from a second device, second metadata corresponding to a second journal, wherein the second device is remote from the first device. The method further comprises recovering the first metadata based on the second metadata, the first journal and the second journal.

In another aspect of the present disclosure, there is provided a device for recovering metadata. The device comprises a processing unit and a memory, and the memory is coupled to the processing unit and has instructions stored thereon. The instructions, when executed by the processing unit, cause the processing unit to perform acts comprising detecting whether first metadata corresponding to a first journal at a first device is corrupted, and in response to detecting that the first metadata is corrupted, obtaining, from a second device, second metadata corresponding to a second journal, wherein the second device is remote from the first device. The acts further comprise recovering the first metadata based on the second metadata, the first journal and the second journal.

In a further aspect of the present disclosure, there is provided a computer program product. The computer program product is tangibly stored on a non-transient computer readable medium and comprises computer executable instructions. The computer executable instructions, when executed, cause a computer to execute the method or procedure according to embodiments of the present disclosure.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features and advantages of example embodiments of the present disclosure will become more apparent, wherein the same reference sign generally refer to the same element.

DETAILED DESCRIPTION OF EMBODIMENTS

Figure 1:
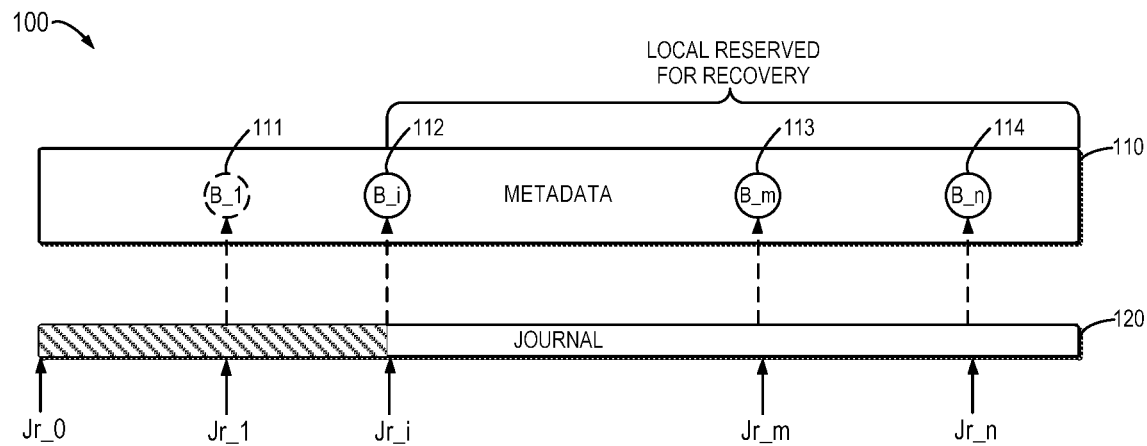
FIG. 1 illustrates a schematic diagram of a traditional structure of the journals and metadata at a local device.

Various embodiments of the present disclosure will now be described with reference to the drawings. Although some specific embodiments disclosed herein are illustrated in the drawings, it would be appreciated that the present disclosure can be implemented in various manners and should not be limited to the embodiments described herein. Rather, those embodiments are provided merely to describe the present disclosure thoroughly and completely, and enable the scope of the present disclosure to be conveyed fully to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" and the like may represent different objects or the same object.

Traditionally, the storage system can obtain the latest metadata by loading the latest dumped metadata and replaying journals. However, if the latest metadata is corrupted, the storage system will be unable to obtain the metadata. Hence, the traditional method is to reserve the metadata snapshots within a period of time for recovery. For example, FIGS. 1-2 illustrate diagrams of the this method, where FIG. 1 illustrates a diagram of a traditional structure of the journals and metadata at a local device, and FIG. 2 illustrates a diagram of a traditional structure of the journals and metadata at a remote device.

As shown in FIG. 1, a set of metadata 110 includes periodically dumped metadata 111, 112, 113 and 14, and a set of journals 120 includes journals that are generated sequentially. In order to perform recovery when the latest metadata is corrupted, the metadata within a period of time should be reserved. For example, in the embodiment of FIG. 1, the metadata 112, 113 and 114 may be reserved for recovery. The metadata preceding the metadata 112 and the corresponding journals can be deleted. In addition, since the storage system further supports a complete remote backup, as shown in FIG. 2, the set of metadata 210 and the set of journals 220 are also stored at the remote device, and the metadata set 210 includes therein metadata (for example, metadata 211 through 212) within a period of time for recovery. The metadata preceding the metadata 211 and the corresponding journals may be deleted.

Figure 2:
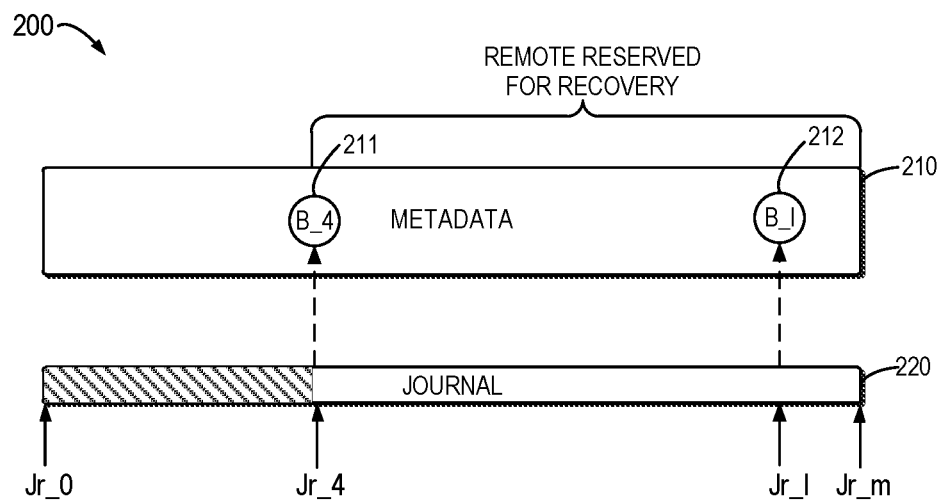
FIG. 2 illustrates a schematic diagram of a traditional structure of the journals and metadata at a remote device.

However, both the local device in FIG. 1 and the remote device in FIG. 2 store some metadata for backup, leading to high metadata overhead and occupying too much storage space. In addition, the storage system provides, using replication, additional protection for the user data; and in a multi-site environment where there is a plurality of remote backups, the reserved metadata cause the capacity overhead to grow exponentially. It is seen that the traditional backup method occupies too much storage space (in particular, in a scenario of multi-site remote backup), causing too much storage overhead. In addition, one traditional storage system always reserves metadata for fourteen days, which means that metadata within fourteen days cannot be deleted and thus occupy too much storage space.

To this end, a remote recover solution for metadata is proposed in embodiments of the present disclosure. In embodiments of the present disclosure, if the local metadata (which for example includes index information) is corrupted, remote backup metadata are used for recovery without the need of reserving metadata snapshots locally, thereby saving the storage space and reducing the capacity overhead for the metadata accordingly. In other words, in embodiments of the present disclosure, it is only required to reserve the latest metadata in each device in a distribution environment of remote backup without the need of reserving other metadata snapshots, thereby saving the storage space and improving the resource utilization rate.

With reference to FIGS. 3 to 8, basic principles and several example implementations of the present disclosure will be described below. It would be appreciated that these example embodiments are provided merely to enable those skilled in the art to better understand and further implement the embodiments of the present disclosure, rather than limiting the scope of the present disclosure in any manner.

Figure 3:
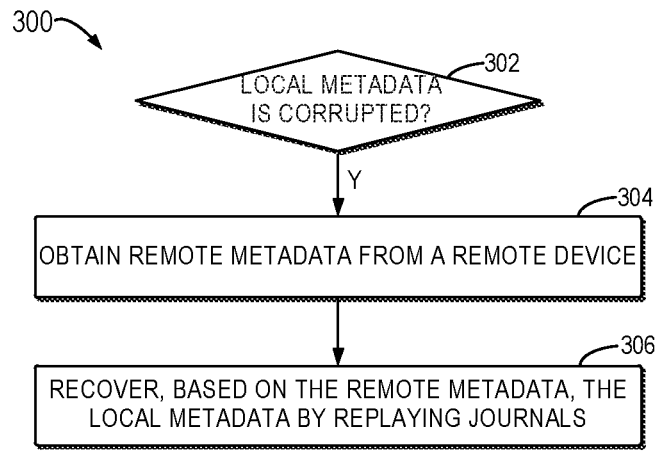
FIG. 3 illustrates a flowchart of a method for recovering metadata according to embodiments of the present disclosure.

FIG. 3 illustrates a flowchart of a method 300 for recovering metadata according to embodiments of the present disclosure. It would be appreciated that, although description will be made below with reference to a B+ tree as an example of the metadata format, other types of metadata formats are allowable, and the scope of the embodiments of the present disclosure is not limited by the data structure type of the metadata.

At 302, it is detected whether local metadata at a local device is corrupted. In the storing process of a storage system, journals can be generated continuously, and the journals are replicated from the local device to a remote device for backup, and the remote device can update its metadata according to journal replaying. Journals are used to reserve information of events occurring in the system and records of operation executed for various objects. In some embodiments, only the journals(s) that has not been replicated to the remote device may be reserved in the local device, while the journal(s) that has been replicated to the remote device are deleted.

If corruption to the local metadata is not detected at 302, the system can continue operating normally without requiring recovery. Instead, if corruption to the local metadata is detected at 302, remote metadata are obtained from the remote device at 304, wherein the metadata is used to describe data of user data in the storage system. According to embodiments of the present disclosure, instead of storing metadata snapshots in both of the local device and the remote device, the local device and the remote device can both store the latest metadata only, and when the local metadata is corrupted, recovery can be implemented using the remote metadata.

In some embodiments, the metadata may be stored using a B+ tree index structure. The B+ tree is a balanced binary tree, which is a balanced search tree designed for a disk or other direct access auxiliary devices. In B+ tree, all record nodes are stored into leaf nodes at the same layer in a size sequence of key values, and various leaf nodes are connected via pointers. By using the B+ tree for storing metadata, the data query and search efficiency can be improved. The storage system can use journals and a B+ tree to ensure integrity of object metadata.

At 306, the local metadata are recovered by replaying journals based on the remote metadata. For example, a set of all journals generated between a time of the corresponding journal of the remote metadata and a time of a corresponding journal of the local metadata can be replayed so as to recover the local metadata. In embodiments of the present disclosure, replaying journals refers to that a system recovers a state of another point by replaying journals starting from the preceding save point. In some embodiments, the metadata may be used to search data in a distribution storage system which may be a highly expanded object storage system and provide additional protection using replication.

Therefore, the method 300 according to embodiments of the present disclosure uses the remote backup metadata for recovery in the case that the local metadata is corrupted, without reserving metadata snapshots locally, thereby reducing the amount of stored data. In other words, for example, for the latest corruption to the B+ tree, embodiments of the present disclosure can recover metadata from remote backup, rather than metadata snapshots reserved locally, and thus embodiments of the present disclosure can avoid incurring too much storage capacity overhead. The method according to the embodiments of the present disclosure can accomplish remote recovery of metadata, because the latest remote journals and metadata and the local journals are sufficient for recovering metadata (for example, a B+ tree and the like) in the local device, even though metadata snapshots are not reserved locally.

Figure 4:
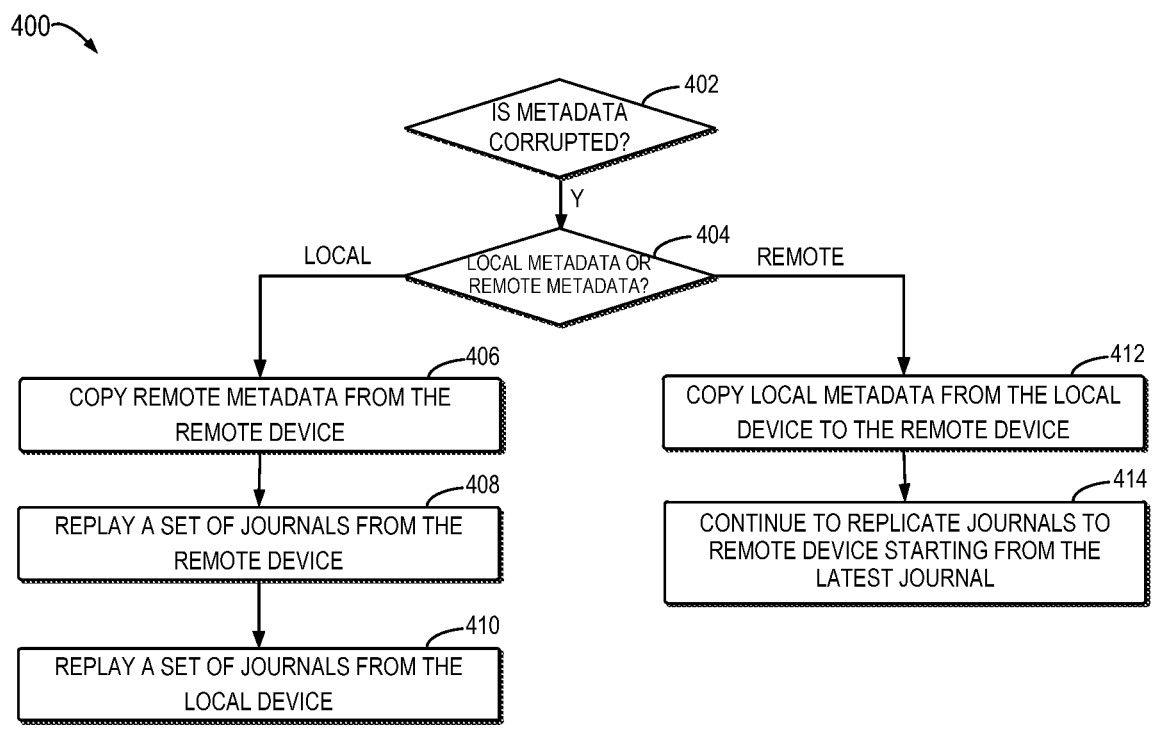
FIG. 4 illustrates a flowchart of a process of processing metadata corruption according to embodiments of the present disclosure.

FIG. 4 illustrates a flowchart of a process 400 of processing metadata corruption according to embodiments of the present disclosure. It would be appreciated that the process 400 may be a specific example implementation of the method 300 as described above with reference to FIG. 3. For convenience of describing some example embodiments of the present disclosure more clearly, the process 400 will be described with reference to FIG. 4 in combination with FIGS. 5-7.

Figure 5:
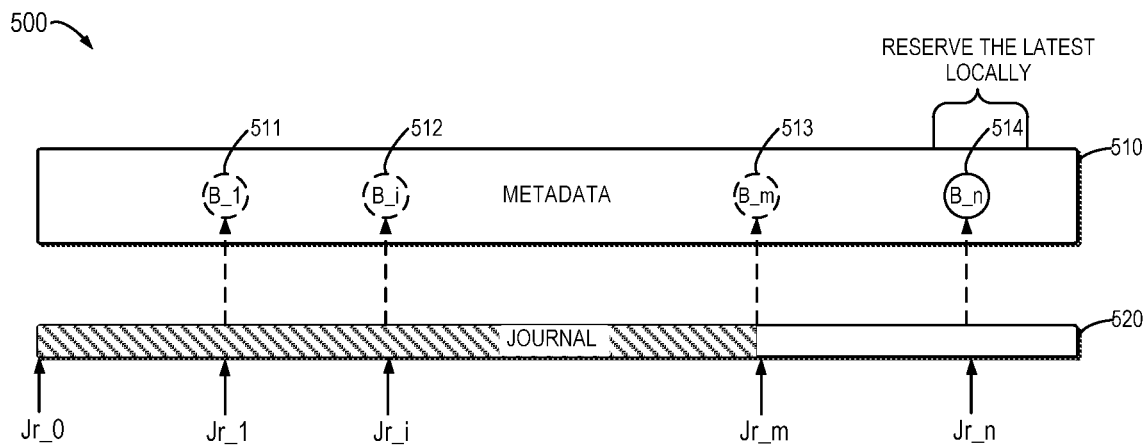
FIG. 5 illustrates a schematic diagram of an example structure of the journals and metadata at a local device according to embodiments of the present disclosure.

At 402, it is determined whether the metadata is corrupted. For example, FIG. 5 illustrates a schematic diagram of an example structure 500 of the journals and metadata at the local device according to embodiments of the present disclosure. Referring to FIG. 5, B_{x} represents metadata dumped periodically, where x is 0, 1 m, n and the like, such as a B+ tree, Jr_{x} represents journals sorted sequentially, each <B_{x}, Jr_{x}> pair forms a metadata snapshot. By loading B_{x} and replaying journals after the journal Jr_{x}, the storage system can recover the metadata to any point after the journal Jr_{x}. As shown in FIG. 5, the first journal of the storage system is Jr_0, and the last journal of the storage system is Jn_n. B_n may be the latest dumped B+ tree corresponding to the journal Jr_n, which includes all metadata before the journal Jr_n.

A set of metadata 510 only reserves the latest dumped local metadata 514 corresponding to the journal Jr_n, and the metadata 511, 512 and 513 generated previously have been all deleted at the local device. Since embodiments of the present disclosure can recover the local metadata through the remote metadata of the remote device, it is unnecessary to occupy the local storage space for storing the old versions of metadata. Hence, the local metadata 514 may be the latest local metadata and the only metadata reserved locally. The set of journals 520 includes journals generated sequentially, and in the state of FIG. 5, journals before the journal Jr_m have been all replicated to the remote device and thus may be deleted, without being further stored at the local device. Instead, it is only required to store journals after the journal Jr_m at the local device for recovery. In other words, in the state of FIG. 5, the journals stored at the local device are <Jr_m, Jr_n>. As a result, embodiments of the present disclosure can reduce the storage overhead for metadata and further reduce the storage overhead for journals.

Figure 6:
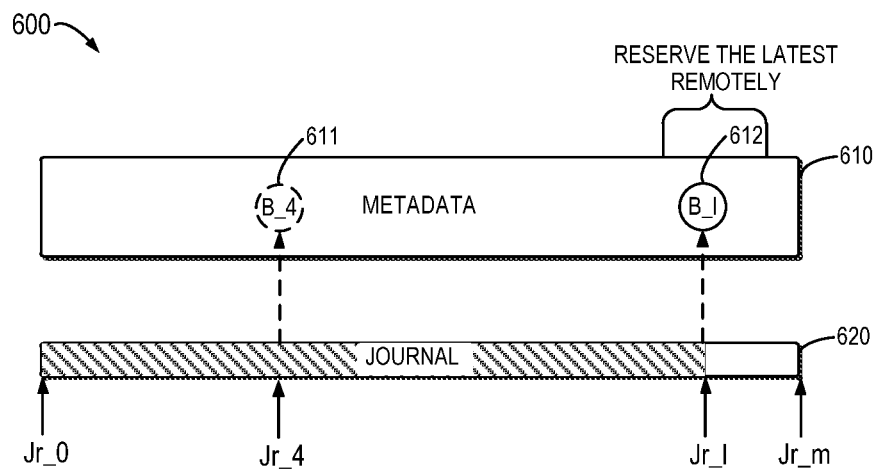
FIG. 6 illustrates a schematic diagram of an example structure of the journals and metadata at a remote device according to embodiments of the present disclosure.

FIG. 6 illustrates a diagram of an example structure 600 of the journals and metadata at a remote device according to embodiments of the present disclosure. As shown in FIG. 6, a set of metadata 610 and a set of journals 620 are stored at the remote device, the latest journal replicated from the local device to the remote device is the journal Jr_m, and the latest metadata generated at the remote device is remote metadata 612 (for example, a B+ tree) corresponding to the journal JILL In some embodiments, for journal replication, an update cycle may be determined based on a strong consistency or eventual consistency policy and the like. The journals after the journal Jr_m have not been replicated from the local device to the remote device. According to embodiments of the present disclosure, since the newer local metadata may be used for overriding when the remote metadata is corrupted, it is only required to store the latest metadata 612 at the remote device while the old versions of metadata, such as metadata 611 and the like, may be deleted. Consequently, the remote metadata 612 (i.e., B_1) is the latest remote metadata and the only metadata reserved remotely. In addition, since the metadata corresponding to the journal Jr_1 has been generated, the journals before the journal Jr_1 at the remote device may be deleted. As such, the journals stored at the remote device are <Jr_1, Jr_m>. In this way, it is also only to store the latest metadata at the remote device, thereby saving the storage space.

Figure 7:
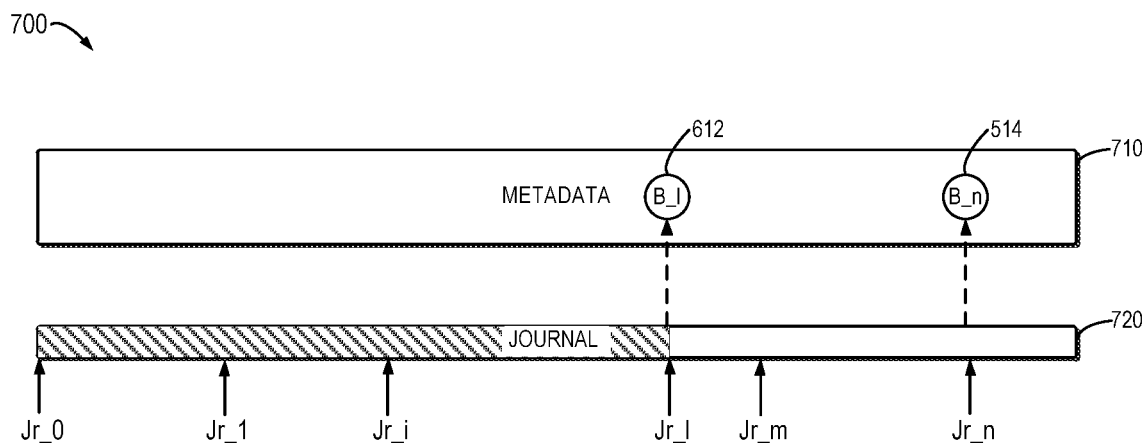
FIG. 7 illustrates a schematic diagram of a combined structure of the journals and metadata at a local device and a remote device according to embodiments of the present disclosure.

FIG. 7 illustrates a diagram of a combined structure 700 of the journals and metadata at a local device and a remote device according to embodiments of the present disclosure. In other words, the structure 500 at the local device and the structure 600 at the remote device may be combined logically to generate a logically combined structure 700, wherein a set of metadata 710 includes the remote metadata 612 and the local metadata 514, and a set of journal 720 includes all journals between the journal Jr_1 and the journal Jr_n. If the local metadata 514 or the remote metadata 612 is corrupted, metadata recovery can be implemented based on the metadata and journals stored at both the local device and the remote device. For example, the metadata 514 (i.e., B_n) can be recovered by loading the metadata 612 (i.e., B_1) and replaying journals between the journal Jr_1 and the journal Jr_n.

Returning to FIG. 4, if it is detected at 402 that the metadata is corrupted, it is further determined at 404 whether the local metadata or the remote metadata is corrupted. For corruption to metadata at different devices, as described herein, different recovery methods can be employed according to embodiments of the present disclosure.

If it is determined at 404 that the local metadata (for example, local metadata 514) is corrupted, remote metadata 612 is copied from the remote device at 406. The set of journals from the remote device, for example, all journals between the journal Jr_1 and the journal Jr_m (i.e., <Jr_1, Jr_m>), is then replayed at 408. The set of journals from the local device, for example, all journals between the journal Jr_m and the journal Jr_n (i.e., <Jr_m, Jr_n>), is replayed at 410. Accordingly, the local metadata 514 can be recovered successfully.

If it is determined at 404 that the remote metadata 612 is corrupted, the local metadata 514 is copied to the remote device at 412. Journals, after the journal corresponding to the latest metadata (for example, from the journal Jr_n in the embodiments of FIGS. 5-7, rather than the journal Jr_m), continue to be replicated to the remote device at 414. Moreover, if the metadata stored in both the local device and the remote device is corrupted simultaneously, it is generally impossible to recover the metadata, similar to the traditional method.

In some embodiments, in the examples of FIGS. 5-7, if the latest journal Jr_m that has transmitted to the remote device has been used to construct the metadata B_m, the local metadata B_n can be recovered directly according to the metadata B_m and <Jr_m, Jr_n> journals. Furthermore, in some embodiments, for a remote backup environment in which there are N devices, the method according to embodiments of the present disclosure can reduce even 93%×N system metadata overhead and save the storage space remarkably.

Figure 8:
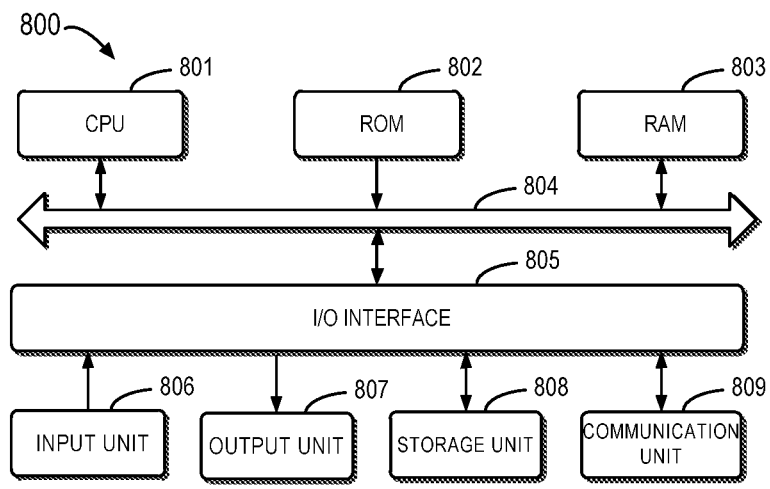
FIG. 8 illustrates an example block diagram of a device that may be used to implement embodiments of the present disclosure.

FIG. 8 illustrates a schematic block diagram of a device 800 that may be used to implement embodiments of the present disclosure, which can be a device or apparatus as described in the embodiments of the present disclosure. As shown therein, the device 800 comprises a central processing unit (CPU) 801 that may perform various appropriate acts and processing based on computer program instructions stored in a read-only memory (ROM) 802 or computer program instructions loaded from a memory unit 808 to a random access memory (RAM) 803. In the RAM 803, there further stores various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806 such as a keyboard, a mouse and the like; an output unit 807 including various kinds of displays and a loudspeaker and the like; a memory unit 808 including a magnetic disk, an optical disk and the like, a communication unit 809 including a network card, a modem, and a wireless communication transceiver and the like. The communication unit 809 allows the device 800 to exchange information/data with other devices through a computer network such as the Internet and/or various kinds of telecommunications networks.

Various processes and processing described above, may be executed by the processing unit 801. For example, in some embodiments, the method may be implemented as a computer software program that is tangibly embodied on a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps and/or processes of the method as described above may be executed.

In some embodiments, the method as described above may be implemented as a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to better explain the principles of the embodiments, the practical application or technical improvement over technologies found in the marketplace, or to enable others of ordinary skill in the art to understand the embodiments disclosed herein.

We claim:

1. A method for recovering metadata, comprising:
   detecting, by a system comprising a processor, whether first metadata, comprising periodically dumped metadata, corresponding to a first journal at a first device is corrupted;
   in response to the detecting indicating that the first metadata, comprising the periodically dumped metadata, is corrupted, obtaining, from a second device, second metadata corresponding to a second journal, wherein the second journal is a latest journal, wherein the second metadata comprises latest dumped metadata, wherein preceding metadata, representing at least part of the periodically dumped metadata preceding the latest journal, is deleted, and wherein the second device is remote from the first device; and
   recovering the first metadata, comprising the periodically dumped metadata, based on the second metadata, the first journal and the second journal.

2. The method of claim 1, wherein the recovering the first metadata comprising the periodically dumped metadata, comprises:
   determining a first time when the first journal is generated and a second time when the second journal is generated;
   obtaining a set of journals generated between the second time and the first time; and
   recovering the first metadata, comprising the periodically dumped metadata, based on the second metadata and the set of journals.

3. The method of claim 1, further comprising:
   replicating a third journal from the first device to the second device for updating the second metadata;
   storing, in the first device, a fourth journal that has not been replicated to the second device; and
   deleting, from the first device, a fifth journal that has been replicated to the second device.

4. The method of claim 1, wherein the recovering the first metadata comprising the periodically dumped metadata, comprises:
   obtaining a first set of journals from the first device between a third journal and the first journal, the third journal being the latest journal that has been replicated from the first device to the second device;
   obtaining a second set of journals from the second device between the second journal and the third journal; and
   recovering, based on the second metadata, the first metadata by replaying the second set of journals and the first set of journals.

5. The method of claim 1, further comprising:
   in response to the second metadata being corrupted:
   sending the first metadata, comprising the periodically dumped metadata, from the first device to the second device; and
   continuing to replicate journals from the first device to the second device starting from the first journal.

6. The method of claim 1, further comprising:
   storing the first metadata, comprising the periodically dumped metadata, and the second metadata using a B+ tree index structure.

7. The method of claim 6, wherein the first metadata, comprising the periodically dumped metadata, is data describing user data in a distribution storage system, the method further comprising:
   searching data in the distribution storage system using the first metadata, comprising the periodically dumped metadata.

8. A device for recovering metadata, comprising:
   a processing unit; and
   a memory coupled to the processing unit and having instructions stored thereon, the instructions, when executed by the processing unit, performing acts of:
   detecting whether first metadata, comprising periodically dumped metadata, corresponding to a first journal at a first device is corrupted;
   in response to the detecting indicating that the first metadata, comprising the periodically dumped metadata, is corrupted, obtaining, from a second device, second metadata corresponding to a second journal, wherein the second journal is a latest journal, wherein the second metadata comprises latest dumped metadata, wherein preceding metadata, representing at least part of the periodically dumped metadata preceding the latest journal, is deleted, and wherein the second device is remote from the first device; and
   recovering the first metadata, comprising the periodically dumped metadata, based on the second metadata, the first journal and the second journal.

9. The device of claim 8, wherein the recovering the first metadata comprising the periodically dumped metadata, comprises:
   determining a first time when the first journal is generated and a second time when the second journal is generated;
   obtaining a set of journals generated between the second time and the first time; and
   recovering the first metadata, comprising the periodically dumped metadata, based on the second metadata and the set of journals.

10. The device of claim 8, the acts further comprising:
    replicating a third journal from the first device to the second device for updating the second metadata;
    storing, in the first device, a fourth journal that has not been replicated to the second device; and
    deleting, from the first device, a fifth journal that has been replicated to the second device.

11. The device of claim 8, wherein the recovering the first metadata comprising the periodically dumped metadata, comprises:
    obtaining a first set of journals from the first device between a third journal and the first journal, the third journal being the latest journal that has been replicated from the first device to the second device;

obtaining a second set of journals from the second device between the second journal and the third journal; and recovering, based on the second metadata, the first metadata, comprising the periodically dumped metadata, by replaying the second set of journals and the first set of journals.

12. The device of claim 8, further comprising:

in response to the second metadata being corrupted:

sending the first metadata, comprising the periodically dumped metadata, from the first device to the second device; and continuing to replicate journals from the first device to the second device starting from the first journal.

13. The device of claim 8, the acts further comprising:

storing the first metadata, comprising the periodically dumped metadata, and the second metadata using a B+ tree index structure.

14. The device of claim 13, wherein the first metadata, comprising the periodically dumped metadata, is data describing user data in a distribution storage system, the acts further comprising:

searching data in the distribution storage system using the first metadata, comprising the periodically dumped metadata.

15. A computer program product, which is stored on a non-transitory computer readable medium and comprises computer executable instructions, the computer executable instructions, when executed, causing a computer to execute operations, comprising: in response to detecting that first metadata, comprising periodically dumped metadata, corresponding to a first journal at a first device is corrupted, obtaining, from a second device, second metadata corresponding to a second journal, wherein the second journal is a latest journal, wherein the second metadata comprises latest dumped metadata, wherein preceding metadata, representing at least part of the periodically dumped metadata preceding the latest journal, is deleted, and wherein the second device is remote from the first device; and recovering the first metadata, comprising the periodically dumped metadata, based on the second metadata, the first journal and the second journal.

16. The computer program product of claim 15, wherein the recovering the first metadata, comprising the periodically dumped metadata, comprises:

determining a first time when the first journal is generated and a second time when the second journal is generated;

obtaining a set of journals generated between the second time and the first time; and recovering the first metadata, comprising the periodically dumped metadata, based on the second metadata and the set of journals.

17. The computer program product of claim 15, wherein the operations further comprise:

replicating a third journal from the first device to the second device for updating the second metadata;

storing, in the first device, a fourth journal that has not been replicated to the second device; and deleting, from the first device, a fifth journal that has been replicated to the second device.

18. The computer program product of claim 15, wherein the operations further comprise:

obtaining a first set of journals from the first device between a third journal and the first journal, the third journal being the latest journal that has been replicated from the first device to the second device;

obtaining a second set of journals from the second device between the second journal and the third journal; and recovering, based on the second metadata, the first metadata, comprising the periodically dumped metadata, by replaying the second set of journals and the first set of journals.

19. The computer program product of claim 15, wherein the operations further comprise:

in response to the second metadata being corrupted:

sending the first metadata, comprising the periodically dumped metadata, from the first device to the second device; and continuing to replicate journals from the first device to the second device starting from the first journal.

20. The computer program product of claim 15, wherein the operations further comprise:

storing the first metadata, comprising the periodically dumped metadata, and the second metadata using a B+ tree index structure, wherein the first metadata, comprising the periodically dumped metadata, is data describing user data in a distribution storage system, and searching data in the distribution storage system using the first metadata, comprising the periodically dumped metadata.

* * * * *